United States Patent
Panfilov

(10) Patent No.: US 12,421,992 B2
(45) Date of Patent: Sep. 23, 2025

(54) TRAPEZOIDAL NUT

(71) Applicant: Dmitri Alexandrovich Panfilov, Alexandria, VA (US)

(72) Inventor: Dmitri Alexandrovich Panfilov, Alexandria, VA (US)

( * ) Notice: Subject to any disclaimer, the term of this patent is extended or adjusted under 35 U.S.C. 154(b) by 0 days.

(21) Appl. No.: 18/178,502

(22) Filed: Mar. 4, 2023

(65) Prior Publication Data

US 2024/0295236 A1 Sep. 5, 2024

(51) Int. Cl.
*F16B 45/00* (2006.01)
*F16B 37/02* (2006.01)

(52) U.S. Cl.
CPC ............ *F16B 37/02* (2013.01); *F16B 45/015* (2021.05)

(58) Field of Classification Search
CPC ........ F16B 37/02; F16B 37/04; F16B 45/002; F16B 45/015
USPC ........ 411/332, 427, 400, 401; 248/300, 301, 248/200, 220.1, 262, 267
See application file for complete search history.

(56) References Cited

U.S. PATENT DOCUMENTS

| | | | | |
|---|---|---|---|---|
| 792,594 A * | 6/1905 | Hiss | ............ | F16L 3/06 256/48 |
| 2,875,805 A * | 3/1959 | Flora | ............ | F16B 37/044 411/105 |
| 3,365,997 A * | 1/1968 | Price | ............ | F16F 1/36 72/267 |
| 3,620,277 A * | 11/1971 | Tummarello | ............ | F16B 37/04 411/134 |
| 3,791,749 A * | 2/1974 | Grille | ............ | F16B 2/245 403/291 |
| 4,607,818 A * | 8/1986 | Georgopoulos | ............ | E06B 9/323 160/902 |
| 5,149,040 A * | 9/1992 | Heath | ............ | F16L 3/243 411/401 |
| 5,885,024 A * | 3/1999 | Zupan | ............ | E04D 1/34 52/549 |
| 5,951,223 A * | 9/1999 | Lindquist | ............ | F16B 37/02 411/104 |
| 6,866,316 B1 * | 3/2005 | Harder | ............ | B60R 11/00 248/300 |
| 8,870,135 B2 * | 10/2014 | Grubbs | ............ | F16L 3/14 248/200 |
| 10,752,471 B2 * | 8/2020 | Cui | ............ | B66C 1/666 |
| 2003/0178545 A1 * | 9/2003 | Ernst | ............ | A47G 1/20 248/300 |

(Continued)

*Primary Examiner* — Flemming Saether

(57) ABSTRACT

The present invention relates to a trapezoidal nut made of sheet metal, proportionally folded under a bend angle to form two parts, with a threaded hole and spikes on one side and a smooth surface hole on another side. The purpose of the invention is to add the ability to attach any object to a nut without compromising its integrity and general purpose, and reliably use a nut without spontaneous unscrewing and detachment from the mounting plane. The goal is achieved by the fact that the trapezoidal nut is fastened with a use of a threaded hole and fixed to be in a static position, with the help of spikes. The smooth surface hole can be used for any purpose at the discretion of the user. The result of the work of the trapezoidal nut is a reliable fixation (without unwanted unscrewing) on a flat surface and the ability to tie or hock anything or any means attached to it.

5 Claims, 1 Drawing Sheet

(56) References Cited

U.S. PATENT DOCUMENTS

| | | | |
|---|---|---|---|
| 2004/0094681 A1* | 5/2004 | Birnbaum | F16L 3/243 |
| | | | 248/300 |
| 2015/0267734 A1* | 9/2015 | Boyer | F16B 37/02 |
| | | | 411/520 |
| 2018/0347453 A1* | 12/2018 | Jaenike | F02B 37/186 |
| 2019/0309789 A1* | 10/2019 | Mahaffey | F16B 37/043 |
| 2020/0347871 A1* | 11/2020 | Wilson | F16B 37/0842 |

* cited by examiner

TRAPEZOIDAL NUT

BACKGROUND OF THE INVENTION

1. Field of the Invention

The present invention relates to a trapezoidal nut made of sheet metal proportionally folded under bend angle to form two parts with a threaded hole and spikes on one side and a smooth surface hole on another side.

2. Description of the Related Art

Several well-known things like: pendant portion 31 from U.S. Pat. No. 3,037,731 A, nut plate assembly from US 20110150599 A1 and plate 19 with teeth 20 from US 20030038014 A1, have the advantage to be fastened, to hold a steady position, and allowing to tie to it. However, the disadvantage of the well-known things is the weak ability to withstand the effects of unscrewing during exploitation because of the vibration, and the lack of a smooth surface hole for pushing and tying (fixing) rope-cable products to it. They are also too complex to manufacture and assemble and they are made from expensive metal.

SUMMARY OF THE INVENTION

The purpose of the invention is to add the ability to attach any object to a nut without compromising its integrity and general purpose, and reliably use a nut without spontaneous unscrewing and detachment from the mounting plane.

The goal is achieved by the fact that the trapezoidal nut is fastened with a use of a threaded hole and fixed to be in a static position, with the help of spikes. The smooth surface hole can be used for any purpose at the discretion of the user.

The result of the work of the trapezoidal nut is a reliable fixation (without unwanted unscrewing) on a flat surface and the ability to tie or hock anything or any means attached to it.

DETAILED DESCRIPTION OF THE INVENTION

Figure 1:
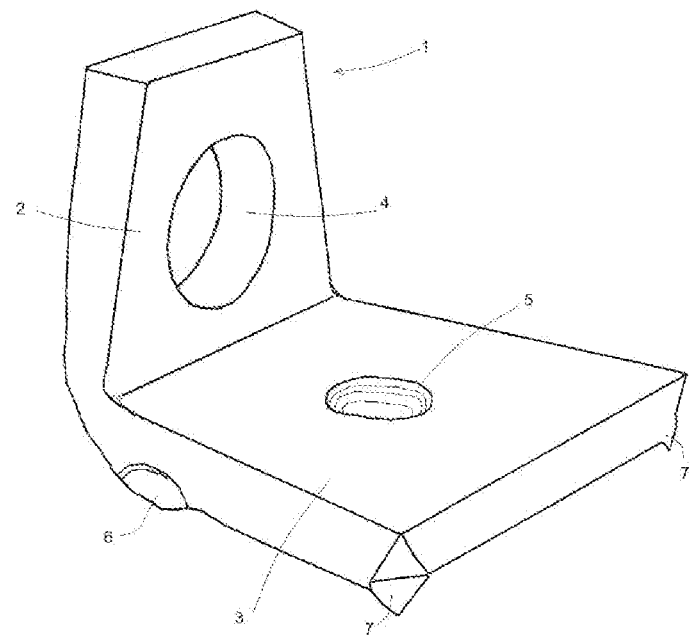
FIG. 1 is a perspective view of a trapezoidal nut.

FIG. 1 is a perspective view of the trapezoidal nut 1 according to the invention. The trapezoidal nut 1 is made from a single piece of sheet metal of trapezoidal shape and has two side parts 2 and 3 with an approximately trapezoidal base area, which oriented at any bend (right) angle to each other as a result of a folding process. Smooth surface hole 4 is made in part 2 by a drilling process. Threaded hole 5 is made in part 3 by drilling and cutting a thread process.

Figure 2:
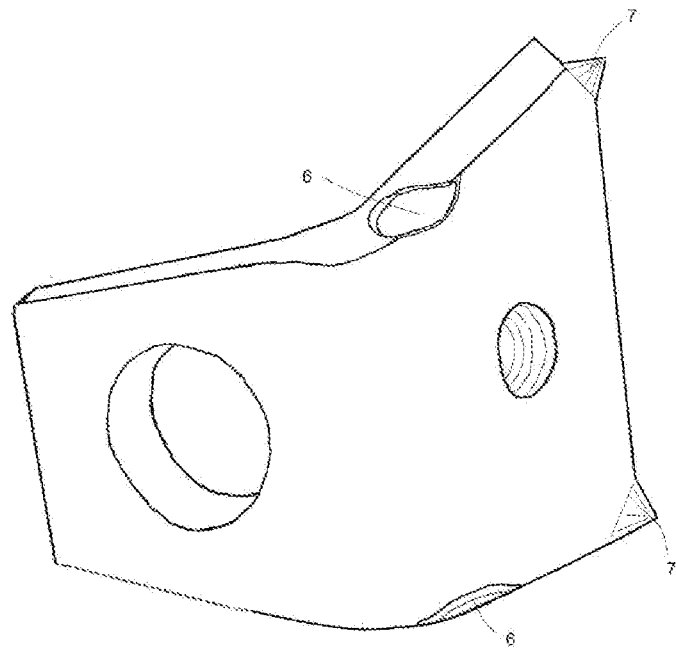
FIG. 2 is a perspective view of a trapezoidal nut showing it from different angle.

FIG. 2 is a perspective view of a trapezoidal nut showing it from different angle of view. Sharp angled spike 7 is made by deforming the corner of the part 3 with a hard object (like a hammer) in a direction towards threaded hole 5. Semi-circle spikes 6 is made by deforming the edge of the part 3 with a hard object (like a hammer) in a direction towards each other.

The proposed trapezoidal nut 1 after installation of the part 3 on the surface with a use of a threaded hole 5 and spikes 6 and 7 securely fixes it to the surface and it stays in static mode relative to the surface. Part 2, with a cylindrical hole 4, can be used to tie or hock anything or any means attached to it.

A significant difference in the design of the proposed trapezoidal nut 1 is that it can be screwed which leads to press it against a flat surface with a use of threaded hole 5, and permanently fixed it on the surface with a use of the spikes 6 and 7, which are an integral part of the trapezoidal nut 1 and has another part 2 with a smooth surface hole 4 that can be used for any purpose reliably without spontaneous unscrewing and detachment of a trapezoidal nut 1 from mounting plane.

This invention has been described as having a preferred design, but, it can be further modified within the scope of technical abilities in following way: trapezoidal nut 1 thickness can be made of any size, its bases and legs can be made of any length, its bend angle can be right, acute or obtuse. So as hole diameter in part 2 and 3 can be any size and they can by accompanied by cutting a thread any type, size and pitch. That is what and how this invention intended to cover any variations, uses, or adaptations of the invention using its general principles.

The invention claimed is:

1. A trapezoidal nut formed from a single piece of trapezoidal shaped sheet metal consisting of: a first side part, a second side part, and a right angle bend between the first side part and the second side part forming a substantial L-shape; the first side part includes a threaded hole; the second side part includes a non-threaded hole; the first side part includes two first spikes at corners distal from the bend which are formed by deforming the corners; the first side part includes two second spikes at lateral edges of the first side part adjacent the bend which are formed by deforming the lateral edges; the first and second spikes project in a direction opposite the second side part.

2. A trapezoidal nut according to claim 1 wherein the first side part has a trapezoidal shape.

3. A trapezoidal nut according to claim 1 wherein the second side part has a trapezoidal shape.

4. A trapezoidal nut according to claim 1 wherein both the first side part and the second side part have a trapezoidal shape.

5. A trapezoidal nut according to claim 1 wherein the threaded hole is formed by drilling and cutting the thread.

* * * * *